Figure 2:
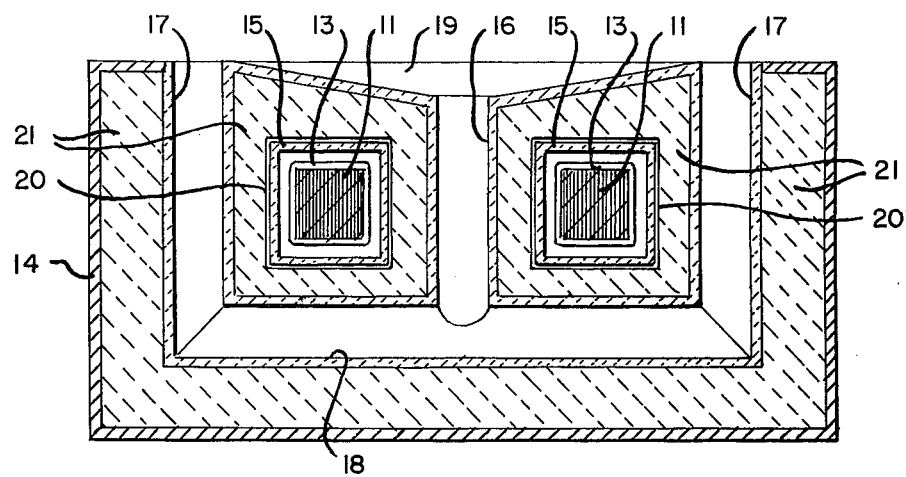

United States Patent [19]

Osterholtz et al.

[11] 3,914,527

[45] Oct. 21, 1975

[54] LINING FOR ZINC POT INDUCTION HEATER

[75] Inventors: Carl E. Osterholtz, Steubenville; Edward Agostinelli, Martins Ferry; Edward Jagucki, St. Clairsville, all of Ohio

[73] Assignee: Wheeling-Pittsburgh Steel Corporation, Pittsburgh, Pa.

[22] Filed: Mar. 28, 1974

[21] Appl. No.: 455,645

[52] U.S. Cl. ............... 13/30; 161/193; 161/206
[51] Int. Cl.² ....................................... F27D 1/10
[58] Field of Search ............ 13/30, 29, 35; 266/43; 161/193, 206

[56] References Cited
UNITED STATES PATENTS

| | | |
|---|---|---|
| 3,345,059 | 10/1967 | Swindt ........................ 266/43 X |
| 3,394,216 | 7/1968 | Troell et al. ........................ 13/30 |
| 3,440,323 | 4/1969 | Howard ........................ 13/30 |
| 3,485,928 | 12/1969 | Ichikawa et al. ........................ 13/30 X |

Primary Examiner—R. N. Envall, Jr.
Attorney, Agent, or Firm—Buell, Blenko & Ziesenheim

[57] ABSTRACT

A lining for a zinc pot induction heater of the type having an iron core, electrical windings thereon, and a channel for molten metal surrounding the windings, comprises a cast-in-place refractory mass sandwiched between a fused silica bushing surrounding the electrical winding and a fused silica prefabricated channel assembly surrounding the bushing but spaced therefrom.

6 Claims, 2 Drawing Figures

LINING FOR ZINC POT INDUCTION HEATER

This invention relates to inductors for induction heating molten metal. It is more particularly concerned with a refractory lining for such an inductor which provides a molten metal channel electrically insulated from the inductor coils and core.

A well-known form of induction melting furnace which has many applications is the submerged resistor type induction furnace, so-called. In this apparatus metal being heated is confined in a channel so as to form a closed loop surrounding an iron core. On the core is wound a primary winding which is supplied with alternating current and the metal in the loop, which forms a short-circuited turn, is heated by the current induced in it. A furnace of this type is described and illustrated in U.S. Pat. No. 1,069,923, issued to Walter E. Crafts on Aug. 12, 1913.

This type of furnace has been adapted to the heating of metals such as zinc and aluminum used to coat steel strip or articles made from steel. A commercially successful process of that nature is disclosed in U.S. Pat. No. 2,647,305, issued to Nelson E. Cook and Samuel Norteman on Aug. 4, 1953. The zinc pot used in that process is provided with a plurality of externally mounted units each comprising an iron core, a primary winding and a channel for the metal surrounding the winding. On one side of the unit the channel opens into the zinc pot.

A commercial installation of this type for coating steel strip with zinc with which we are familiar employs a zinc pot which is fitted with six such inductor units. Each unit is energized with 60 cycle 440 volt power. The temperature of the zinc pot is about 450°C. The lining between the molten metal forming the secondary turn and the primary winding, as well as the core, must withstand continuous operation under those conditions.

Each inductor unit is mounted in a steel case which encloses the molten metal channel except at its junction with the zinc pot. It also encloses the central part of the core and the primary winding. The ends of the core project beyond the case. Prior to our invention to be described each primary coil was surrounded by a heavy copper sleeve or bushing which was split lengthwise so as not to form a closed loop or turn. Those sleeves are disclosed and claimed in the Crafts patent previously mentioned. They were thought to be necessary to the dissipation of heat generated in the primary winding. Space is provided between the primary winding and the sleeve for the circulation of air and in the operation of the unit air is forced through this space by a fan to reduce the build up of heat in the primary winding. This is also disclosed in the Crafts patent.

When the installation with which we are familiar was first put into operation some 20 years ago, the refractory lining of the molten metal channel was formed in place. A demountable metal form or pattern of the channel was set in position inside the inductor case. The copper sleeves were inserted through holes in the case to form bushings for the coil and primary winding. Plug forms were inserted through other holes in the case at the ends of the cross-channel pattern element. The remaining space within the case was then filled by tamping or ramming it with particulate refractory material. After this operation was completed, the metal form was removed. This required removal of the plug forms so that the cross-channel pattern could be pushed out. The holes were filled with plugs of refractory material. Those plugs are shown in the drawing of the Cook et al patent. The whole operation required from 10 to 16 hours. Failure of the refractory in service occurred because of the formation of cracks through which molten zinc reached the primary coil.

Subsequently, it was found that a castable refractory could be used. A wooden pattern for the channel, and the copper sleeve bushings were inserted in the case and the fluid refractory concrete mixture was poured into the case around the pattern between the copper bushings and the case. After the refractory had set, the wooden pattern was burned out. The savings in time over the ramming process were substantial, but as the pattern was destroyed, each time the inductor was lined, the services of a pattern maker were required to provide patterns. Failure in service occurred in the same way as before, by the formation of cracks through which zinc reached the primary coil. In some instances the steel case was lined to a thickness of two or three inches with insulating silicon carbide or fire clay bricks before being filled with the refractory mix, either by ramming or by casting.

It is an object of our invention to provide a composite ceramic lining for an inductor as described above that requires no pattern or form. It is another object to provide such a lining that can be installed in less time than has heretofore been required. It is another object to provide such a lining that is less susceptible to cracking than those previously known. Other objects of our invention will appear in the course of the description thereof which follows.

The lining of our invention comprises a prefabricated refractory channel portion which contains the metal, prefabricated refractory bushings which surround the core and windings, and a cast refractory composition filling the space between the elements above mentioned and the inductor case. The composite structure thus provided is much less susceptible to cracks which cause failure than the linings previously employed and eliminates for both purposes previously mentioned the copper sleeves previously considered to be necessary.

An embodiment of our invention presently preferred by us is illustrated in the attached figures, to which reference is now made.

Figure 1:
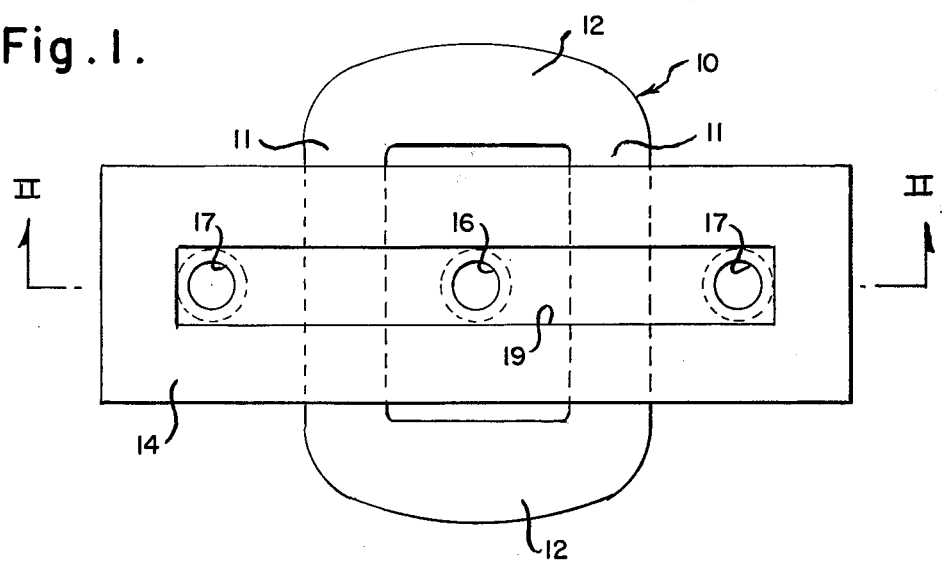

FIG. 1 is a plan of an induction heating unit embodying our composite lining, and FIG. 2 is a cross section of the apparatus of FIG. 1 taken on the plane II—II of that Figure.

The induction heating unit comprises a rectangular core of iron or other magnetizeable metal 10 having two legs 11 connected at each end by yokes 12. Core 10 is made of laminations in the usual way. On each leg 11 is wound a primary coil 13. Core 10 is mounted crossways in a rectangular metal case 14. Legs 11 project at each end through openings in the side walls of case 14 and yokes 12 are wholly outside case 14. Within the case each leg 11 and coil 13 is surrounded by an open-ended ceramic sleeve or bushing 15 which extends crossways of case 14. Clearance is provided between the inside surface of bushing 15 and primary coil 13. Centrally located between core legs 11 is an upright ceramic tube 16 and between each leg 11 and the end of case 14 is an upright ceramic tube 17. The lower ends of these tubes open into a ceramic cross-tube 18. The upper ends of those tubes open from an open-top cross-channel 19, also ceramic, which slopes downwardly from each tube 17 to central tube 16. Case 14 is constructed to be attached to the end or side of a zinc pot or the like so that the open-topped channel 19 is connected with the interior of the pot.

Ceramic tubes 15, 16, 17, 18 and 19 are made of fused silica. Tubes 16, 17, 18 and 19 may be made separately and fused together. The spaces between those tubes and between those tubes and case 14 are filled with a cast refractory 21 comprising fused particulate silica grain and calcium aluminate cement. The fused silica tubes and bushings have a very low coefficient of thermal expansion at the operating temperature of the zinc pot. The cast refractory shrinks somewhat upon setting, but expands upon heating to its working temperature. The net effect is an expansion of the cast refractory somewhat greater than that of the fused silica tubes and bushings. A thin layer 20 of compressible material such as insulating paper is wrapped around each bushing 15 to accommodate the expansion above mentioned and so prevent cracking of the fused silica during the curing and heating up phase. Once an inductor unit is placed in service, under favorable conditions it operates continuously at the zinc pot temperature.

While we prefer to make the prefabricated portion of our lining from fused silica as we have mentioned, it may be made of other refractory ceramic material having a low coefficient of thermal expansion. Likewise, the cast refractory portion of our lining may be of other low coefficient of expansion refractory material. The fused silica material which we prefer to use for our prefabricated lining portion has a reversible thermal expansion of about 0.2 to 0.35 x $10^{-6}$ in./in./°F at molten zinc temperatures. The cast silica grain calcium aluminate refractory has a reversible thermal expansion of between about 0.4 and 0.75 x $10^{-6}$ in./in./°F. This difference arises because between about 3 and 15 percent more silica is converted to the fused state in the prefabricated shapes than in the cast refractory, and because the calcium aluminate in the latter has a higher coefficient of thermal expansion than fused silica.

We find that in our composite lining above described used in an inductor destructive cracking is greatly reduced, if not eliminated, over that found in linings previously employed. While cracks may form in service, either in the fused silica elements or in the cast refractory, the likelihood of their coinciding so that molten zinc can reach the primary winding through a continuous crack is small. When a crack starts, either in a fused silica shape or in the cast refractory, it propagates until it reaches an interface with the other lining component, and usually goes no further.

We also find that the split copper sleeve around the primary winding shown in the Crafts patent and quite generally employed heretofore is unnecessary with our lining. Our composite lining provides for better cooling of the inductor coil than linings previously used.

In the foregoing specification we have described a presently preferred embodiment of this invention, however, it will be understood that this invention can be otherwise embodied within the scope of the following claims.

We claim:

1. In an induction heating unit for molten metal having a core of magnetizable material, electrical windings thereon and a refractory lining defining a molten metal path surrounding the windings, the improvement comprising a composite refractory lining comprising a unitary prefabricated refractory bushing surrounding the electrical winding, a unitary prefabricated refractory channel surrounding the bushing but spaced therefrom, and a cast-in-place refractory mass filling the space between the bushing and the channel.

2. Apparatus of claim 1 in which the cast-in-place refractory mass is spaced from the electrical winding only by insulating material.

3. Apparatus of claim 1 in which the bushing and the cast-in-place refractory mass are spaced from each other by a layer of compressible sheet material.

4. Apparatus of claim 3 in which the cast-in-place refractory mass shrinks upon setting, and expands upon heating with a coefficient of thermal expansion greater than that of the prefabricated refractory channel, and the thickness of the layer of compressible material is not less than the net difference in expansion of the cast-in-place refractory mass and the prefabricated refractory channel at the molten metal temperature.

5. The apparatus of claim 1 in which the unitary prefabricated refractory bushing and the unitary prefabricated refractory channel are fused of the same particulate refractory material as the cast-in-place refractory mass.

6. The apparatus of claim 5 in which the particulate refractory material is silica.

* * * * *